United States Patent
Young et al.

(10) Patent No.: US 9,377,973 B2
(45) Date of Patent: Jun. 28, 2016

(54) METHOD AND SYSTEM FOR IMPROVING PRINTING EFFICIENCY IN THE PRODUCTION PRINTING ENVIRONMENT

(71) Applicant: KONICA MINOLTA LABORATORY U.S.A., INC., San Mateo, CA (US)

(72) Inventors: Kenneth H. Young, Foster City, CA (US); Randy Cruz Soriano, San Leandro, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 12 days.

(21) Appl. No.: 14/193,200

(22) Filed: Feb. 28, 2014

(65) Prior Publication Data

US 2015/0249771 A1    Sep. 3, 2015

(51) Int. Cl.
  *G06K 15/00* (2006.01)
  *G06F 3/12* (2006.01)
  *H04N 1/00* (2006.01)
  *H04N 1/32* (2006.01)

(52) U.S. Cl.
  CPC ............ *G06F 3/121* (2013.01); *H04N 1/00344* (2013.01); *H04N 1/32106* (2013.01); *H04N 1/32635* (2013.01); *H04N 1/32662* (2013.01); *H04N 2201/3219* (2013.01)

(58) Field of Classification Search
  None
  See application file for complete search history.

(56) References Cited

U.S. PATENT DOCUMENTS

| 5,287,194 A | * | 2/1994 | Lobiondo | 358/296 |
| 5,727,135 A | * | 3/1998 | Webb et al. | 358/1.14 |
| 2011/0172961 A1 | * | 7/2011 | Sunata | 702/179 |

OTHER PUBLICATIONS

SpencerLAB, "Cost Savings Calculator by inmprovign efficiency", http://www.spencerlab.com/testing/productivity/Calculator.asp (2 pages).
HP Graphic Arts, "HP SmartStream production Analyzer", http://h10088.www1.hp.com/cda/gap/display/main/index.jsp?zn=gap&cp=20000-13698-16021-14391-29212^304456_4041_100___ (1 page).

* cited by examiner

*Primary Examiner* — Dov Popovici
(74) *Attorney, Agent, or Firm* — Buchanan Ingersoll & Rooney PC

(57) ABSTRACT

A method and system for improving printing efficiency in a production printing environment, which includes a plurality of printers is disclosed, the method including: monitoring the plurality of printers via at least one server, wherein each of the plurality of printers are configured to provide a print job status to the at least one server; receiving an error message from at least one of the plurality of printers; selecting an operator from a list of operators assigned to the at least one of the plurality of printers, wherein each operator on the list of operators is capable of fixing an error associated with the error message on the at least one of the plurality of printers; and notifying the selected operator to investigate the error message via a client device.

20 Claims, 7 Drawing Sheets

METHOD AND SYSTEM FOR IMPROVING PRINTING EFFICIENCY IN THE PRODUCTION PRINTING ENVIRONMENT

FIELD OF THE INVENTION

This invention relates to a method and system for improving printing efficiency in the production printing environment.

BACKGROUND

In a production printing environment, the print service providers of mono-function printers and multi-function printers (hereinafter collectively referred to as printers or MFPs), which are also known as "PSP" or "users of the MFP" are always trying to increase printing efficiency in order to increase the profit margin. Increasing efficiency can be achieved in many areas of the print production process, for example, from digital front end solution (for example, a web-based digital store) through complete enterprise solutions (MIS) that provide end-to-end solutions from initial order taking to final printing fulfillment and shipping.

In a mono-function or multi-function printer (MFP) machine, the print service providers (PSP) do not necessarily view the rated speed of the engine (pages per minute) to evaluate the overall performance of the engine. Instead, for example, PSPs can include other factors such as number of paper jams, time to clear jams, machine downtime waiting for parts, etc. All these events play a part in the total productivity of each MFP. For example, a PSP can have the following MFP configuration: speed of MFP=100 pages per minute; chargeable cost per page to customer=2 cents per page for black and white copies (and 20 cents per page for color prints); and chargeable cost in an 8-hour shift=$960 for black and white copies and $9,600 for color copies based on for example, 480 minutes per shift, 100 pages per minute, and 48,000 total pages per day.

For example, if an MFP is not used for 1 hour in a 24 hour day due to clearing paper jams, this can amount to approximately $60 for black and white printing and approximately $600 for color copies per day in lost revenue. Thus, the 100 pages per minute (ppm) MFP can effectively become an 87.5 ppm engine if one factors in downtime (i.e., 42,000 pages printed per day instead of 48,000). Accordingly, it would be desirable to ensure that the PSPs are capable of keeping the MFPs running at all times to minimize the amount of downtime, thus reducing the amount of lost revenue.

In addition, PSPs typically employ one machine operator to handle 2-3 MFPs concurrently. The job of the operator can be to clear paper jams, load paper, replace empty toner, etc. Based on the fact that PSPs assign more than one MFP per operator and the goal is to keep engines running 24 hours per day with minimal downtime, two MFP that are assigned to the same operator can be down at the same time. In accordance with an exemplary embodiment, the method and system as disclosed herein can provide a solution to this problem and other related problem associated with the production printing environment.

SUMMARY OF THE INVENTION

In consideration of the above issues, it would be desirable to have a system and method, which improves printing efficiency in the production printing environment.

In accordance with an exemplary embodiment, a method for improving printing efficiency in a production printing environment is disclosed, the production printing environment including a plurality of printers, the method comprising: monitoring the plurality of printers via at least one server, wherein each of the plurality of printers are configured to provide a print job status to the at least one server; receiving an error message from at least one of the plurality of printers; selecting an operator from a list of operators assigned to the at least one of the plurality printers, wherein each operator on the list of operators is capable of fixing an error associated with the error message on the at least one of the plurality of printers; and notifying the selected operator to investigate the error message via a client device.

In accordance with an exemplary embodiment, a computer program product comprising a non-transitory computer readable medium having a computer readable code embodied therein for improving printing efficiency in a production printing environment is disclosed, the production printing environment including at least one host server and a plurality of printers, the computer readable program code configured to execute a process, which includes the steps of: monitoring the plurality of printers via at least one server, wherein each of the plurality of printers are configured to provide a print job status to the at least one server; receiving an error message from at least one of the plurality of printers; selecting an operator from a list of operators assigned to the at least one of the plurality printers, wherein each operator on the list of operators is capable of fixing an error associated with the error message on the at least one of the plurality of printers; and notifying the selected operator to investigate the error message via a client device.

In accordance with an exemplary embodiment, a production printing environment is disclosed, the production printing environment comprising: at least one client device; a plurality of printers; a server configured to be connected to the plurality of printers through a network connection, and wherein the server is configured to perform the following: monitor the plurality of printers; provide a print job status to the at least one client device; receive an error message from at least one of the plurality of printers; select an operator from a list of operators assigned to the at least one of the plurality printers, wherein each operator on the list of operators is capable of fixing an error associated with the error message on the at least one of the plurality of printers; and notify the selected operator to investigate the error message via a client device.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

In accordance with an exemplary embodiment, it would be desirable to have a method and system of improving efficiency, for example, in the area of increasing efficiency of machine operators through the use of software algorithms that can assign operators to handle machine downtime.

Figure 1:
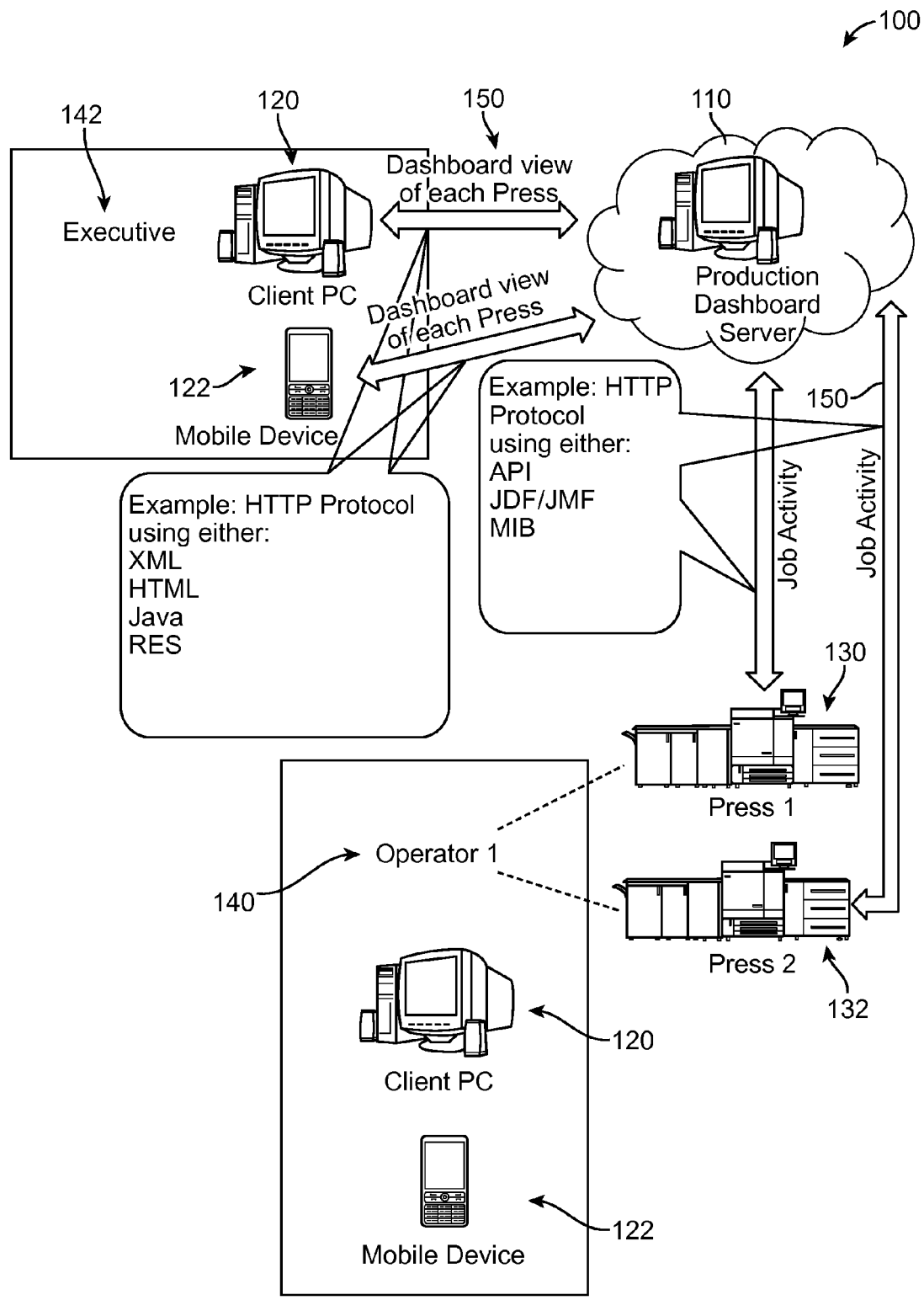
FIG. 1 is an illustration of system for improving printing efficiency in the production printing environment in accordance with an exemplary embodiment.

FIG. 1 is an illustration of a system 100 for improving printing efficiency in the production printing environment in accordance with an exemplary embodiment. As shown in FIG. 1, the system 100 includes at least one server 110, one or more client devices 120, 122, and two or more MFPs 130, 132. In accordance with an exemplary embodiment, the two or more MFPs 130, 132 are preferably a plurality of MFPs 130, 132, for example, at least 4 or more machines having at least one operator for each two machines 130, 132. It can be appreciated that the term MFP (for multi-function printer), engine, and/or machine 130, 132 can be used interchangeably.

In accordance with an exemplary embodiment, the at least one server 110 can be a remote server (for example, a cloud server), which is connected to the two or more multi-function printers 130, 132 via a network connection such a network (e.g., LAN or WAN). In accordance with another embodiment, the at least one server 110 can be hosted on one of the two or more multi-function printers 130, 132. Examples of the telecommunication line and/or network consistent with embodiments of the invention include, but are not limited to, telecommunication or telephone lines, the Internet, an intranet, a local area network (LAN), a wide area network (WAN) and/or a wireless connection using radio frequency (RF) and/or infrared (IR) transmission.

In accordance with an exemplary embodiment, the least one server 110 is preferably a computer like device having a processor and one or more memories for storing software programs and data related to production, job activity and/or throughput of the two or more MFPs 130, 132.

In accordance with an exemplary embodiment, each of the one or more client devices 120 can include a processor or central processing unit (CPU), one or more memories for storing software programs and data (such as files to be printed). The processor or CPU carries out the instructions of a computer program, which operates and/or controls at least a portion of the functionality of the client devices 120. Each of the client devices 120 also includes an operating system (OS), which manages the computer hardware and provides common services for efficient execution of various software programs. For example, the software programs can include application software and printer driver software.

Each of the one or more client devices 120 can also include a display in the form of a graphical user interface. In accordance with an exemplary embodiment, each of the one or more client devices 120 includes software that generates a dashboard or view of the output or production rates of each of the two or more multi-function printers 130, 132. For example, each of the client devices 120 can be configured to receive real-time data and/or e-mails from the multi-function printers 130 via a network, a wireless and/or a cellular device on the production rates based on current production and/or production over one or more time-frames and/or periods. Examples of client devices 120 include and are not limited to personal computers and/or personal digital assistants (PDAs). Each of the client devices 120 can be read and/or monitored by a user, for example, an operator, a supervisor and/or a manager and/or executive 122.

Examples of mono-function printers and multi-function printers 130, 132 consistent with exemplary embodiments include, but are not limited to, a laser beam printer (LBP), a multifunction laser beam printer including copy function, an ink jet printer (IJP), a thermal printer (for example, a dye sublimation printer) and a silver halide printer. For example, the mono-function or multi-function printers 130, 132 can be a color printer or a black and white (B/W) printer. In addition, the MFPs 130, 132 can include accessory units, which can perform such functions as stapling, hole punching, folding, binding, insertion of cover sheets and tab sheets, booklet formation, etc.

In accordance with an exemplary embodiment, the two or more MFPs 130, 132 can be operated by one or more operators 140. Each of the one or more operators 140 can be assigned to one or more MFPs 130, 132. In accordance with an exemplary embodiment, each of the one or more operators 140 preferably has access to a personal computer 120 and/or personal digital assistants (PDAs) or mobile device 122, which are configured to received information regarding production rates for each of the two or more MFPs and alerts related to errors and/or delays associated with production printing of one or more of the MFPs 130, 132.

Figure 2:
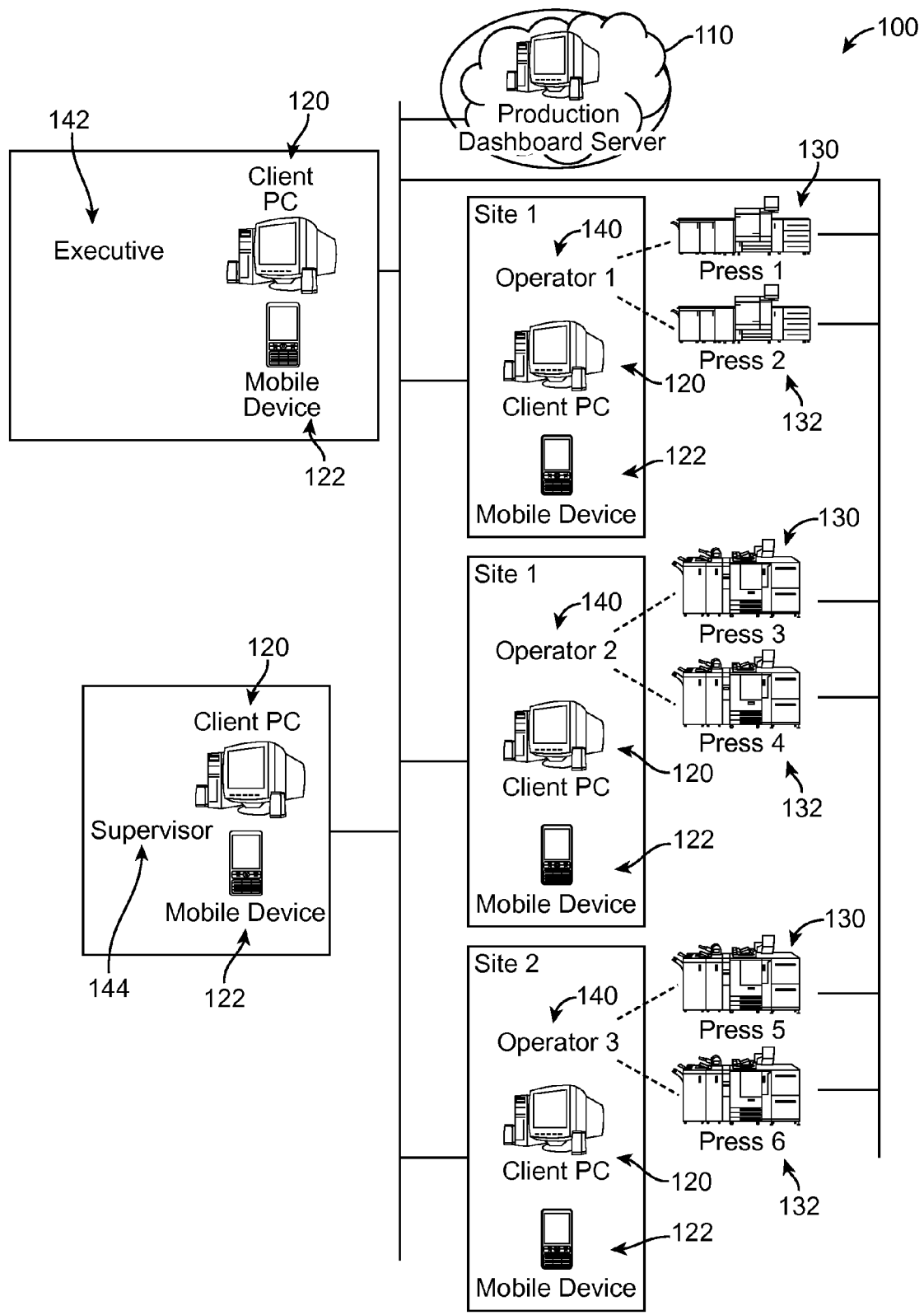
FIG. 2 is an illustration of a system for improving printing efficiency in the production printing environment in accordance with an exemplary embodiment.

FIG. 2 is an illustration of a system 100 for improving printing efficiency in the production printing environment in accordance with an exemplary embodiment. As shown in FIG. 2, in accordance with an exemplary embodiment, the system 100 include at least one server 110, one or more client devices 120, 122 associated with an executive and/or manager 142, one or more client devices 120, 122 associated with a supervisor or manager 144, and two or more MFPs 130, 132, each of the two or more MFPs 130, 132 having at least one operator 140. Each of the operators 140 preferably having access to at least one client device, for example, a personal computer 120 and/or a personal digital assistant (PDA) or mobile device 122.

In accordance with an exemplary embodiment, each of the two or more MFPs 130, 132 are connected 150 to the at least one server 110, which monitors the output of each of the two or more MFPs 130, 132. In addition, the at least one server 110 are connected via a network connection or wireless system 150 to the operators 140 and supervisors and/or executives 142, 144 to provide real-time production rates and output for each of the two or more MFPs 130, 132. The connections 150 can be, for example, a network connection such as public telecommunication line and/or a network (e.g., LAN or WAN) (not shown). Examples of the telecommunication line and/or network consistent with embodiments of the invention include, but are not limited to, telecommunication or telephone lines, the Internet, an intranet, a local area network (LAN), a wide area network (WAN) and/or a wireless connection using radio frequency (RF) and/or infrared (IR) transmission.

Figure 3:
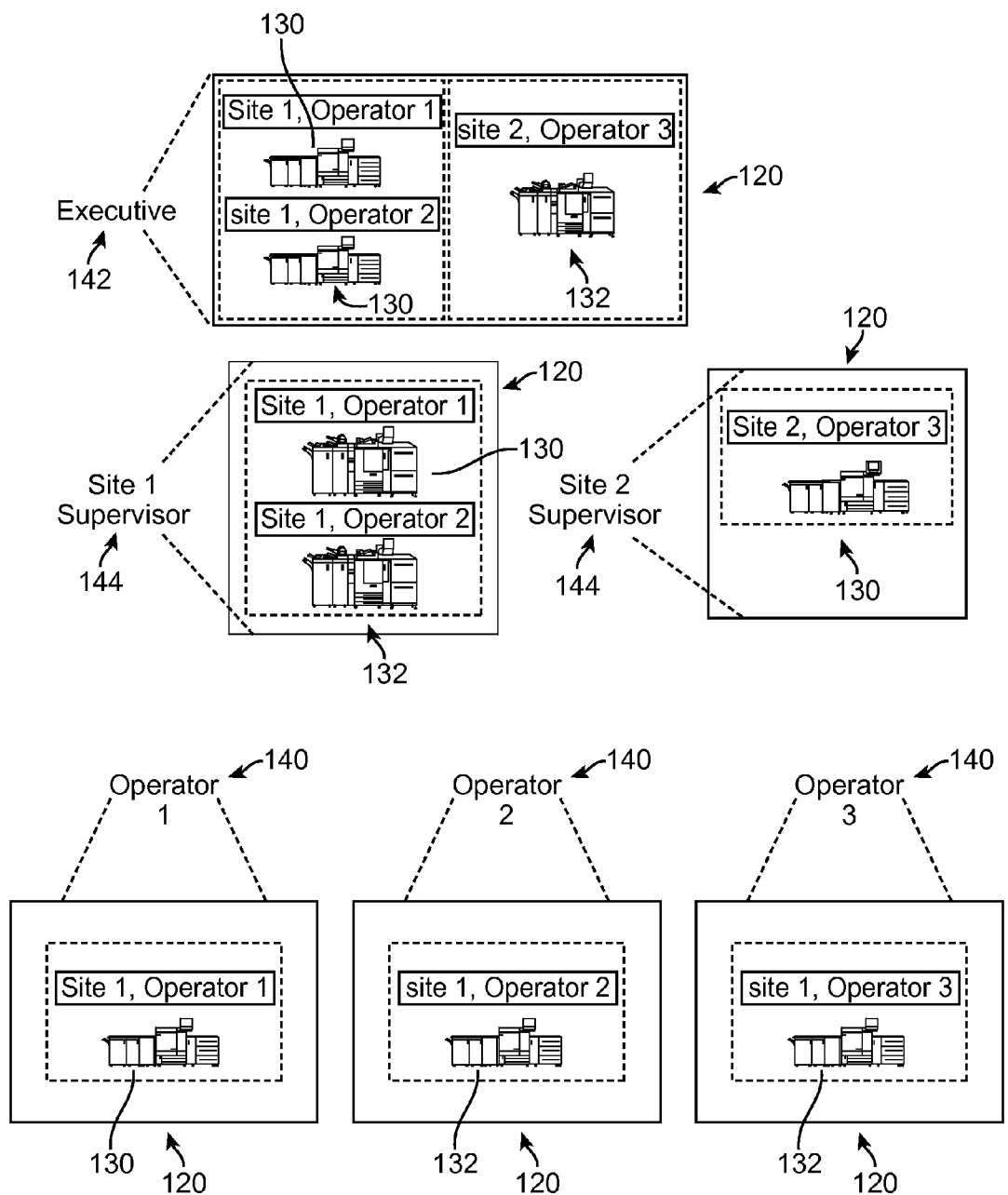
FIG. 3 is an illustration of a system for improving printing efficiency in the production printing environment in accordance with an exemplary embodiment.

FIG. 3 is an illustration of a system 100 for improving printing efficiency in the production printing environment in accordance with an exemplary embodiment. As shown in FIG. 3, each of the client devices 120 can be configured to provide production data to a supervisor or an executive 142 for two or more sites and/or operators 140, a site supervisor 144, wherein each site supervisor 144 receives information related to only his or her site, and two or more operators, 140, which can be assigned to one or more MFPs 130, 132.

It can be appreciated that in accordance with an exemplary embodiment, it would be desirable to ensure that each of the two or more MFPs 130, 132 is always up and running so at to maximize throughput of each of the MFPs 130, 132. In addition, it can be desirable that each of the operators 140 is aware if one or more of the MFPs 130, 132 needs operator attention. For example, in a printing environment where there are 50 MFPs 130, 132 running at the same time, it can be very difficult to visually see which of the MFPs 130, 132 is currently down unless the operator is right beside the MFP.

One solution employed by many MFP manufacturers is to support an "attention light" that sits atop the MFP 130, 132. For example, when a jam occurs, the attention light will turn "ON" with a flashing RED light to indicate that the MFP 130, 132 requires attention. Another method, which is less popular, can be to have the software running on the MFP 130, 132, that has the capability to send text messages to the operator 140 when the MFP 130, 132 requires attention. In this situation, no matter where the operator 130, 132 is located (for example, having lunch or on a 10-minute break), he or she will know if the machine 130, 132 requires attention. By supporting this capability through software, operators can attend to the MFP 130, 132 when it goes down. However, it can be appreciated that circumstances can arise where the operator 140 is unable to tend to the MFP needing attention for some time, which can result in loss of production.

In accordance with an exemplary embodiment, it would be desirable to have a software application that resides on a server 110 that communicates with the MFPs 130, 132 and one or more client devices 120, 122, which are assigned to the operators 140, for example, a personal computer (PC) 120, and/or a mobile device or a personal digital assistant (PDA) 122 so that the operators 140 can attend to the MFPs 130, 132 as quickly as possible to reduce production loss.

It can be appreciated that there can be many reasons why a multi-function printer (MFP) 130, 132 can experience downtime. For example, one common problem with MFPs 130, 132 is paper jams. In accordance with an exemplary embodiment, a text message can be sent to the operator 140 notifying the operator that one of his or her MFP 130, 132 has a paper jam. However, if the operator 140 is on a break, for example, lunch, and does not attend to the jam until after he/she returns from lunch, productivity is lost for the MFP 130, 132 during this time. In accordance with an exemplary embodiment, text messages can be sent to the supervisor in order to alert the supervisor that one of the MFPs 130, 132 needs attention and the supervisor can assign a different operator to look into the jam. For example, in accordance with an exemplary embodiment, each text message can be sent to different users, depending on the type of the user. It can be appreciated that it would be desirable that rather than involving the supervisor, the at least one server 110 includes a software application, which is configured to assign another operator to the MFP in case the operator assigned to the MFP 130, 132 is not available.

In accordance with an exemplary embodiment, the users can include, for example, three types of users, namely, operators, supervisors and/or executives. In general, the operators 140 operate the MFPs 130, 132 including loading the MFPs 130, 132 with paper and insuring that the MFPs are running smoothly including removing paper jams and other related error and/or problems. Supervisors supervise the operators and can be in charge of one or more production printing environments.

For example, in accordance with an exemplary embodiment, at the operator level, the system 100 can be configured to quickly notify (via for example, a text message) at least one of the operators 140 of the paper jam. In these types of cases, the supervisor or executive does not need to get receive such messages. However, upon a certain number of minutes (configurable in the system 100), if the jam is not resolved, the supervisor can receive a similar message or text. In accordance with an exemplary embodiment, the system 100 can be configured to have the capability of resending the text message to the supervisor for as long as the jam is not resolved. In addition, in the case of a hardware failure, since it requires service to be initiated (and the operator does not have the authority to call for service), the supervisor can be immediately notified with this situation.

In accordance with an exemplary embodiment, the system is preferably configured that the operator only receives messages that pertain to machines 130, 132 that he/she is assigned. At the supervisor level, for example, the supervisors can receive messages that from multiple machines (MFP) and/or multiple operators. For example, for problems such as jams, in accordance with an exemplary embodiment, the executive preferably does not receive such messages.

In accordance with an exemplary embodiment, when an error is resolved (paper jam, hardware, etc.), another test message can be broadcast to the appropriate user. For example, the operator who resolved the error can have the capability to use the default "problem resolved" notification to be announced to the supervisor, or, he/she can override the default in case they would like to notify the supervisor any special steps taken to resolve the problem.

In accordance with an exemplary embodiment, the server 110 can be configured to support production reports, such that the server software support for this feature is the capability of making reports at the executive level on how well the MFP has performed over an 8-hour shift. For example, this can allow the executive to make decisions on how well each production facility is performing relative to the efficiency of each PSP location (for example, there can be multiple facilities scattered throughout the country)

In accordance with an exemplary embodiment, the PSP can set for each machine/operator a specific goal on the number of pages each MFP should print within an 8-hour shift. For example, by setting goals, the supervisor can monitor the performance of each machine/operator.

In accordance with an exemplary embodiment, the server 110 can be configured to provide operators 140, supervisors and/or executives 144/142 a quick overview of how well each MFP/operator 130, 132/140 is performing relative to the other MFP/operator 130, 132/140 in the print facility. For example, the overview can show information such as the MFP status, number of paper jams, images printed per hour, uptime and goals at each level of the organization. For example, the overview can include information such as an operator's performance, wherein the operator has a goal of 40 K pages to print and has currently printed 34,955 pages. However, at the time the overview is provided, the overview can include information including that the operator should be at around 38,000 pages in order to achieve its goal of 40,000 pages before the operator's shift is over. In addition, information such as the number of paper jams and errors can also be provided. The overview can also show that a second operator is showing better performance than the first operator, wherein the first operator has had only 1 jam and currently overachieving as the second operator is over his goal, for example, 41,000 pages printed.

In accordance with an exemplary embodiment, since the PSP will assign multiple engines 130, 132 per operator 140, an operator can be attending to one engine 130, 132 while concurrently another engine 130, 132 for which he/she is assigned may also go down. In accordance with an exemplary embodiment, in this situation, the server 110 for the PSP not only can assign an operator 140 to multiple engines 130, 132 but can also assign the operator 140 to be part of a team, which is assigned to a group or plurality of machines 130, 132, which are assigned to two or more operators. For example, in accordance with an exemplary embodiment, the team can then be held responsible for multiple engines 130, 132 so that when one engine 130, 132 goes down and the operator 140 primarily assigned to it is unavailable, then other members (or operators 140) of the team may be need to help out and/or assist to resolve the issue and/or problem.

Figure 4:
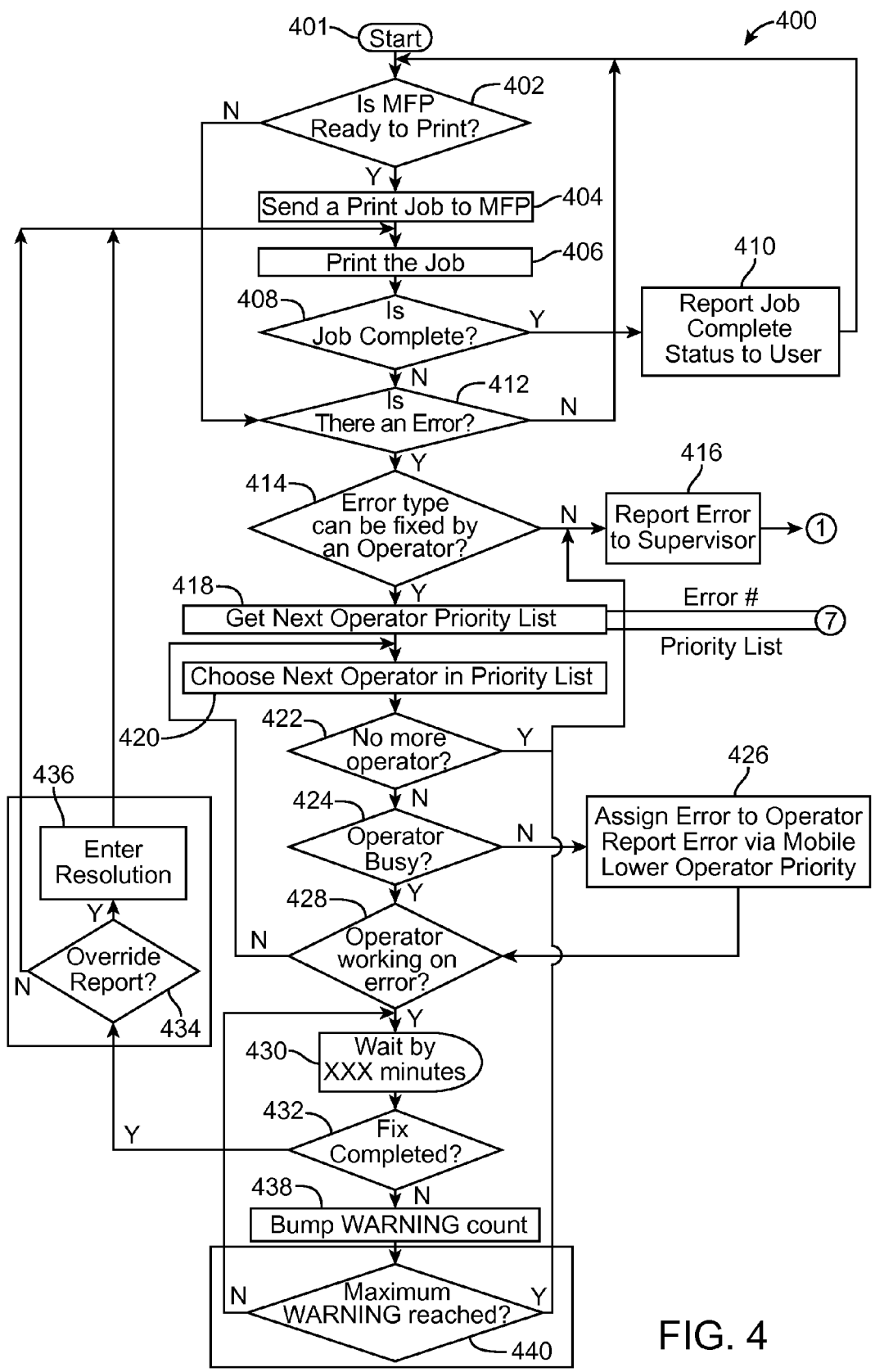
FIG. 4 is a flow chart of a method for improving printing efficiency in the production printing environment in accordance with an exemplary embodiment.

FIG. 4 is a flow chart 400 of a method for improving printing efficiency in the production printing environment, which includes a system 100 as shown in FIGS. 1-3. The system 100 preferably includes at least one server 110, one or more client devices 120, 122 associated with an executive and/or manager 142, one or more client devices 120, 122 associated with a supervisor or manager 144, and two or more MFPs 130, 132, each of the two or more MFPs 130, 132 having at least one operator 140.

As shown in FIG. 4, the process as disclosed is preferably executed in the at least one server 110. The process starts in step 401, and proceeds to step 402, wherein a determination can be made if the MFP is ready to print and/or receive a print job for processing. The status of the MFP as determined in step 402 is preferably sent to the at least one server 110. If the MFP is ready to execute a print job, in step 404, a print job is sent to the MFP, and the process continues to step 406, wherein the print job is printed by the MFP. In step 408, a determination is made if the print job is completed or if the print job has stopped for one or more reasons. If the job has been completed, in step 410, the print job is reported as completed and a report can be sent to the operator or user. In addition, if the job is complete, the process returns to step 402, where another print job can be sent to the MFP.

If the job is not completed, in step 412, the process determines if the print job is not completed, if there is an error associated with the MFP, and the type of error. If in step 412, the process determines that there is no error associated with the MFP, the process returns to step 402. Alternatively, if in step 412, if the process determines that there is an error associated with the MFP, and the type of error can be identified, the error can be sent to the server 110 for assignment to an operator as further set forth herein. In addition, if the MFP is not ready to print in step 402, and wherein for example, the MFP has one or more pending print jobs, the process can continue to step 412 to check if there is an error associated with the MFP and the type of error.

In step 414, a determination is made, if the type of error is one that can be fixed by an operator. If the type of error cannot be fixed by an operator, in step 416, the error is reported to a supervisor. If the type of error, which can be corrected by an operator, in step 418, the next operator on a priority list is selected to fix the error or problem. In step 420, the next operator on the priority list is selected and assigned to fix the error on the MFP. In step 422, if no more operators are available, the process can proceed to step 410 and a supervisor can be notified and/or alternatively, the process can proceed to step 440, wherein a maximum warning signal can be sent to a supervisor to advise the supervisor that no operators are available to fix the error. If operators are available, in step 424, a determination can be made if one or more operators are available in the system, however, in fact, each or all of the operators are busy and which is not recorded in the database associated with the server. In step 426, if an operator is available, the error is reported and assigned to the operator. In accordance with an exemplary embodiment, for example, the error can be reported via a mobile device as a lower operator priority. In step 428, a determination is made to determine if the error or problem is being worked on by an operator. If no one is working on the error or problem, the process returns to step 420, wherein the next operator on the priority list is selected and assigned to fix the error on the MFP.

In step 430, a wait time can be assigned to fix the error or problem on the MFP. In step 432, a determination can be made if the error has been fixed. If the error or problem has not been fixed, the process continues to step 438, where a bump warning count can be issued, which can be allow an operator several chances to fix the problem or error in an average amount of time to resolve issue. If the error or problem has been fixed, the process continues to step 434, where an override report can be issued. In step 436, the solution to the error or problem can be recorded. In step 440, a maximum warning signal can be issued as set forth above.

Figure 5:
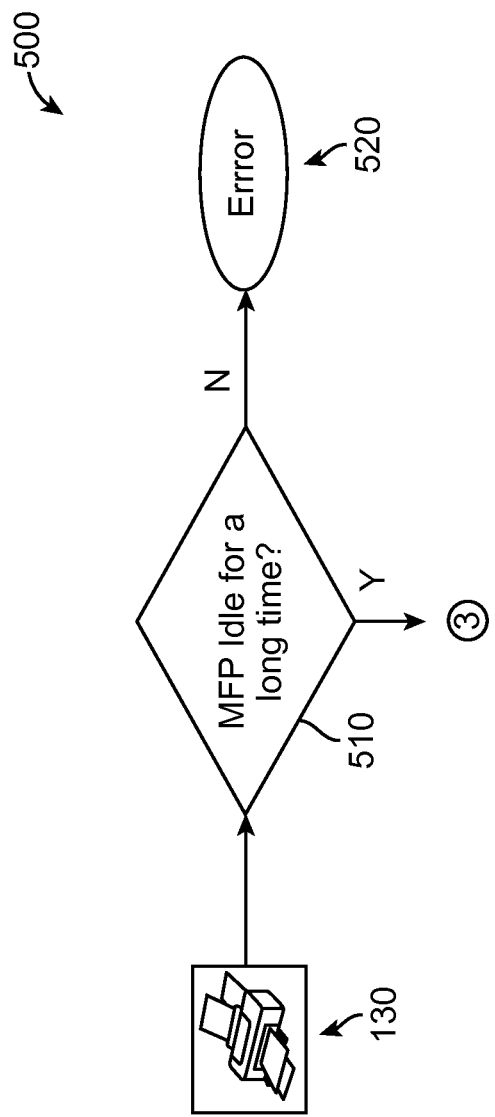
FIG. 5 is a flow chart of a method for improving printing efficiency in the production printing environment in accordance with an exemplary embodiment.

FIG. 5 is a flow chart 500 of a method for improving printing efficiency in the production printing environment in accordance with an exemplary embodiment. In accordance with an exemplary embodiment as shown in FIG. 5, the MFP 130, 132 can be configured that such that in step 510, a determination can be made if the MFP is idling for an extended time. In step 520, the determination can be made that an error or problem is the cause of the idle, or alternatively, in step 630, a determination can be made that a supervisor should investigate the problem as shown in FIG. 6.

Figure 6:
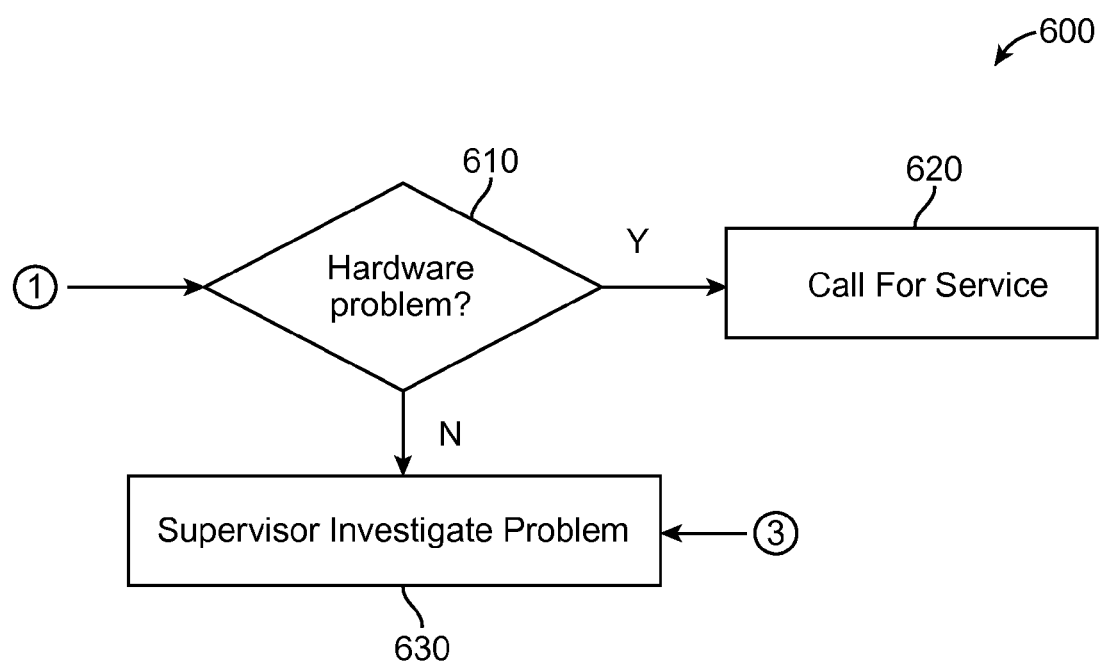
FIG. 6 is a flow chart of a method for improving printing efficiency in the production printing environment in accordance with an exemplary embodiment.
Figure 7:
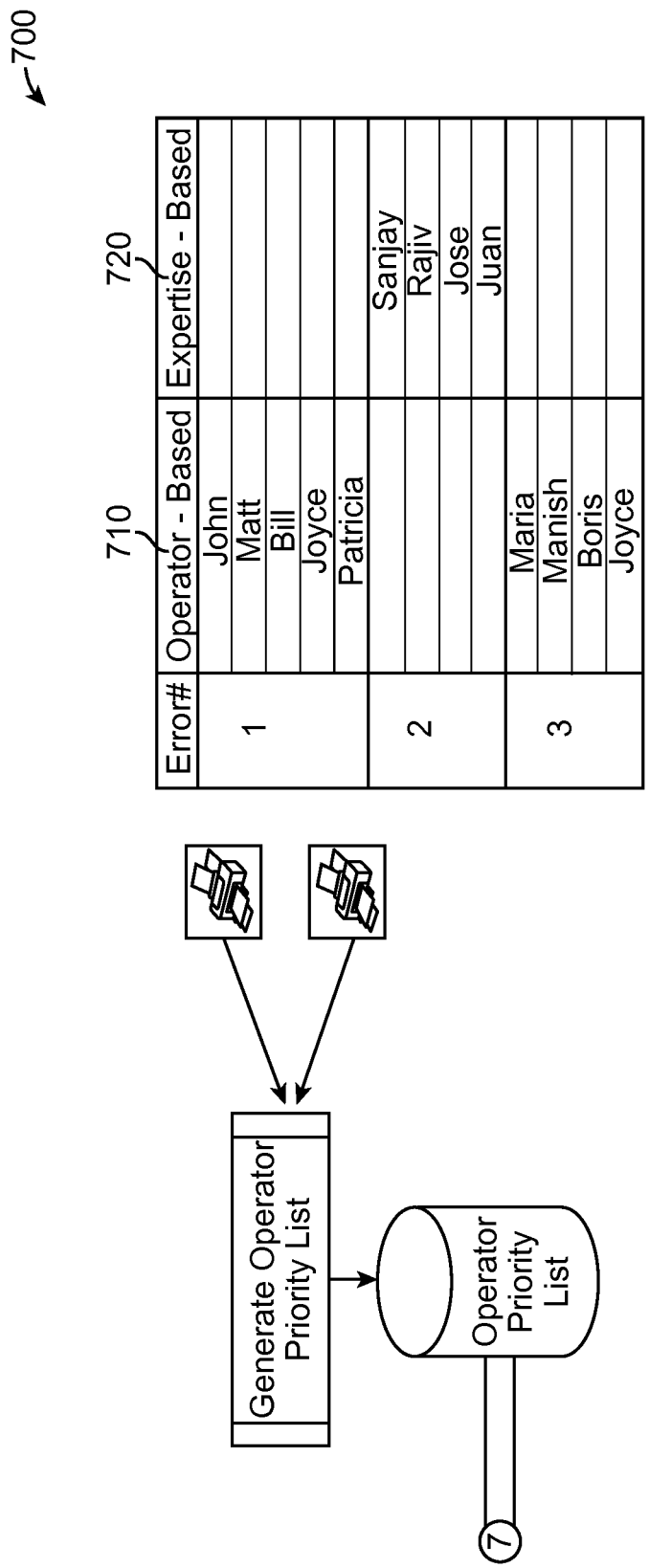
FIG. 7 is a chart of a method for improving printing efficiency in the production printing environment in accordance with an exemplary embodiment.

FIG. 6 is a flow chart 600 of a method for improving printing efficiency in the production printing environment in accordance with an exemplary embodiment. As shown in FIG. 6, if the MFP has been idling for an extended period (or period of time), in step 610, a supervisor can be called or summoned via one or more of the client devices to investigate the cause of the error or problem associated with the MFP. As set forth in step 620, a determination can be made if the problem is a hardware problem, or alternatively, in step 630, that a service technician should be called to fix and/or address the error or problem FIG. 7 is a chart 700 of a method for improving printing efficiency in the production printing environment showing a priority listing of operators in accordance with an exemplary embodiment. This chart is an example for a particular MFP 130, 132. In other words, a single chart can be provided for each of the MFPs 130, 132 installed in the system 100, and these charts can be stored on the at least one server 110 in association with MFPs 130, 132. As shown in FIG. 7, in step 418, the error or problem can be assigned to the next operator on the priority listing of operators. For example, the listing of priority for the plurality of operators can include the type of error, an operator-based priority listing 710 and an expertise-based based priority listing 720. For example, as shown in FIG. 7, certain operators can be assigned to an operator-based priority listing group 710 and/or assigned to an expertise-based priority listing group 720, wherein for certain types of errors, for example paper jams (i.e., errors #1), the operator-based priority group can be assigned to the problem or error, and for expertise-based problems, for example, hardware problem, (i.e., error #2), the expertise-based priority group 720 can be assigned to fix the error or problem.

In accordance with an exemplary embodiment, the operator-based list of operators 710 can be determined, for example, by: first priority can be based on the operator primarily assigned to the MFP, and second priority (for example, second to last priority) can be based on proximity to where the operator is stationed from the MFP and also based on past history on how busy the operator has been in that day. In accordance with an exemplary embodiment, proximity and how busy each of the operators has been can be weighted in order to determine the priority order, for example, for the second priority through last priority; and/or priority can be based or calculated on how busy the operator has been in an 8-hour shift, which can be determined by summing up all the minutes the operator took while assigned on a particular error. For example, in accordance with an exemplary embodiment, how busy an operator has been can be determined based on total time from the time they were assigned the error to the time the problem was resolved.

In accordance with an exemplary embodiment, the expertise-based list of operators 720 can be determined, for example, first priority is based on the expertise level of the operator, and determining the next (or second to last) priority based on a similar approach as determining operator-based errors. For example, in accordance with an exemplary embodiment, priority can also include consideration of future jobs for one or more of the operator, for example, a "Job Look Ahead", which can be factored in to determine priority, for example, if the print job is run as an independent thread, wherein the process constantly recalculating the priority in real time.

In accordance with an exemplary embodiment, a computer program product comprising a non-transitory computer readable medium having a computer readable code embodied therein for improving printing efficiency in a production printing environment is disclosed, the production printing environment including at least one host server and a plurality of printers, the computer readable program code configured to execute a process, which includes the steps of: monitoring the plurality of printers via at least one server, wherein each of the plurality of printers are configured to provide a print job status to the at least one server; receiving an error message from at least one of the plurality of printers; selecting an operator from a list of operators assigned to the at least one of the plurality printers, wherein each operator on the list of operators is capable of fixing the error message associated with the at least one of the plurality of printers; and notifying the selected operator to investigate the error message via a client device.

The non-transitory computer usable medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for improving printing efficiency in a production printing environment, the production printing environment including a plurality of printers, the method comprising:
   hosting a list of operators on at least one server, each operator on the list of operators being assigned to one or more of the plurality of printers, and wherein each operator is capable of fixing at least one type of error on each of the one or more of the plurality of printers;
   generating a priority listing of operators from the list of operators for each of the plurality of printers, wherein the priority listing of operators includes at least two or more operators from the list of operators for each of the plurality of printers;
   monitoring the plurality of printers via the at least one server, wherein each of the plurality of printers are configured to provide a print job status to the at least one server;
   receiving an error message from at least one of the plurality of printers;
   determining a type of error associated with the error message;
   selecting an operator from the priority listing of operators capable of fixing the type of error associated with the error message received from the at least one of the plurality of printers, wherein the selected operator is first on the priority listing of operators; and
   notifying the selected operator to investigate the error message via a client device.

2. The method of claim 1, comprising:
   assigning at least one primary operator to each of the plurality of printers, and
   wherein if the at least one primary operator assigned to the at least one of the plurality of printers reporting the error message is not available, determining the selected operator to investigate the type of error from the priority listing of operators assigned to the at least one of the plurality of printers.

3. The method of claim 1, comprising:
   generating the priority listing of operators based on proximity of the selected operator to the at least one of the plurality of printers reporting the error message.

4. The method of claim 1, comprising:
   generating the priority listing of operators assigned to the at least one of the plurality of printers based on the operator having a fewest number of assignments for an assigned shift.

5. The method of claim 1, comprising:
   generating the priority listing of operators based on a projected schedule of availability for the list of operators assigned to the at least one of the plurality of printers.

6. The method of claim 1, comprising:
   providing override authority to override the selecting of the first operator from the priority listing of operators assigned to the at least one of the plurality of printers and selecting another operator from the priority listing of operators assigned to the at least one of the plurality of printers.

7. The method of claim 1, comprising:
   notifying a supervisor if the at least one of the plurality of printers reporting the error message is not repaired within a predetermined amount of time or cannot be repaired by the selected operator from the priority listing of operators.

8. The method of claim 1, comprising:
broadcasting availability of one or more of the plurality of printers when the one or more of the plurality of printers are not fully utilized.

9. A computer program product comprising a non-transitory computer readable medium having a computer readable program code embodied therein for improving printing efficiency in a production printing environment, the production printing environment including at least one host server and a plurality of printers, the computer readable program code configured to execute a process, which includes the steps of:
hosting a list of operators on at least one server, each operator on the list of operators being assigned to one or more of the plurality of printers, and wherein each operator is capable of fixing at least one type of error on each of the one or more of the plurality of printers;
generating a priority listing of operators from the list of operators for each of the plurality of printers, wherein the priority listing of operators includes at least two or more operators from the list of operators for each of the plurality of printers;
monitoring the plurality of printers via the at least one server, wherein each of the plurality of printers are configured to provide a print job status to the at least one server;
receiving an error message from at least one of the plurality of printers;
determining a type of error associated with the error message;
selecting an operator from the priority listing of operators capable of fixing the type of error associated with the error message received from the at least one of the plurality of printers, wherein the selected operator is first on the priority listing of operators; and
notifying the selected operator to investigate the error message via a client device.

10. The computer program product of claim 9, comprising:
assigning at least one primary operator to each of the plurality of printers, and
wherein if the at least one primary operator assigned to the at least one of the plurality of printers reporting the error message is not available, determining the selected operator to investigate the type of error from the priority listing of operators assigned to the at least one of the plurality of printers.

11. The computer program product of claim 9, comprising:
generating the priority listing of operators based on proximity of the selected operator to the at least one of the plurality of printers reporting the error message.

12. The computer program product of claim 9, comprising:
generating the priority listing of operators assigned to the at least one of the plurality of printers based on the operator having a fewest number of assignments for an assigned shift.

13. The computer program product of claim 9, comprising:
generating the priority listing of operators based on a projected schedule of availability for the list of operators assigned to the at least one of the plurality of printers.

14. The computer program product of claim 9, comprising:
providing override authority to override the selecting of the first operator from the priority listing of operators assigned to the at least one of the plurality printers and selecting another operator from the priority listing of operators assigned to the at least one of the plurality of printers.

15. A production printing environment, the production printing environment comprising:
at least one client device;
a plurality of printers;
a server configured to be connected to the plurality of printers through a network connection, and wherein the server is configured to perform the following:
host a list of operators, each of the operators assigned to one or more of the plurality of printers, and wherein each operator is capable of fixing at least one type of error received from the one or more of the plurality of printers;
generate a priority listing of operators from the list of operators for each of the plurality of printers, wherein the priority listing of operators includes at least two or more operators from the list of operators for each of the plurality of printers;
monitor the plurality of printers;
provide a print job status to the at least one client device;
receive an error message from at least one of the plurality of printers;
determine a type of error associated with the error message;
select an operator from the priority listing of operators capable of fixing the type of error associated with the error message received from the at least one of the plurality of printers, wherein the selected operator is first on the priority listing of operators; and
notify the selected operator to investigate the error message via a client device.

16. The production printing environment of claim 15, wherein the server is configured to perform the following:
assign at least one primary operator to each of the plurality of printers, and
wherein if the at least one primary operator assigned to the at least one of the plurality of printers reporting the error message is not available, determining the selected operator to investigate the error message from the priority listing of operators assigned to the at least one of the plurality of printers.

17. The production printing environment of claim 15, wherein the server is configured to perform the following:
generate the priority listing of operators based on proximity of the selected operator to the at least one of the plurality of printers reporting the error message.

18. The production printing environment of claim 15, wherein the server is configured to perform the following:
generate the priority listing of operators assigned to the at least one of the plurality of printers based on the operator having a fewest number of assignments for an assigned shift.

19. The production printing environment of claim 15, wherein the server is configured to perform the following:
generate the priority listing of operators based on a projected schedule of availability for the list of operators assigned to the at least one of the plurality of printers.

20. The production printing environment of claim 15, wherein the server is configured to perform the following:
provide override authority to override the selecting of the first operator from the priority listing of operators assigned to the at least one of the plurality of printers and selecting another operator from the priority listing of operators assigned to the at least one of the plurality of printers.

* * * * *